United States Patent
Hamasaki et al.

(10) Patent No.: US 6,333,825 B1
(45) Date of Patent: Dec. 25, 2001

(54) VARI-FOCAL LENS (75) Inventors: Takuji Hamasaki; Makoto Iikawa, both of Saitama (JP)

(73) Assignee: Asahi Kogaku Kogyo Kabuhsiki Kaisha, Tokyo (JP)

( * ) Notice: Subject to any disclaimer, the term of this patent is extended or adjusted under 35 U.S.C. 154(b) by 0 days.

(21) Appl. No.: 09/610,959

(22) Filed: Jul. 6, 2000

(30) Foreign Application Priority Data

Jul. 7, 1999 (JP) .................................................. 11-192828

(51) Int. Cl.[7] .................................................. G02B 15/14
(52) U.S. Cl. ........................... 359/699; 359/701; 359/695
(58) Field of Search ................................. 359/823, 695, 359/696, 698, 699, 700, 701, 703, 704, 705, 706; 396/76, 77, 79

(56) References Cited

U.S. PATENT DOCUMENTS

| | | | |
|---|---|---|---|
| 5,144,490 | 9/1992 | Yamanouchi | 359/694 |
| 5,337,187 | 8/1994 | Fukino et al. | 359/699 |
| 5,576,894 | * 11/1996 | Kuwana et al. | 359/701 |
| 5,936,781 | * 8/1999 | Kato | 359/699 |
| 6,195,212 | * 2/2001 | Miyamoto | 359/699 |

FOREIGN PATENT DOCUMENTS

| | | |
|---|---|---|
| 63-49715 | 3/1988 | (JP) . |
| 63314511 | 12/1988 | (JP) . |
| 7333482 | 12/1995 | (JP) . |

* cited by examiner

*Primary Examiner*—Georgia Epps
*Assistant Examiner*—Saeed Seyrafi
(74) *Attorney, Agent, or Firm*—Greenblum & Bernstein, P.L.C.

(57) ABSTRACT

A vari-focal lens includes power varying lens groups including a focusing lens group; a zooming ring; a focusing ring; a focusing lens frame supporting the focusing lens group; an intermediate moving frame supporting the focusing lens frame; a zoom cam ring; a focus cam ring which rotates with the zoom cam ring and is relatively movable thereto in the optical axis direction; and first and second cam followers formed on the focusing lens frame and intermediate moving member, respectively, which are engaged with focus cams of the focus cam ring. The focus cam ring moves in the optical axis direction relative to the focusing lens frame and the intermediate moving frame and rotates about the optical axis while being guided by the focus cams to thereby change a position of engagement of the first cam followers and the second cam followers relative to the focus cams.

10 Claims, 10 Drawing Sheets

VARI-FOCAL LENS

BACKGROUND OF THE INVENTION

1. Field of the Invention

The present invention relates to a vari-focal lens or vari-focal zoom lens, which requires slight focus adjustment as it varies the focal length, unless focused on infinity.

2. Description of the Related Art

Vari-focal lens or vari-focal zoom lens is defined as a lens whose focal plane slightly moves as the focal length varies. Therefore, the position of the focusing lens group (the amount of movement of the focusing lens group from a reference position) that is necessary for bringing an object at the same object distance into focus varies as the user varies the focal length. In AF (autofocusing) cameras, the amount of movement of the focusing lens group from a reference position at each focal length has only to be determined by taking into account the focal shift as the focal length varies, namely, the amount of movement of the focusing lens group at each focal length has only to compensate for a slight deviation of the focal plane from an in-focus position thereof as the focal length varies. Even in conventional MF (manual focusing) SLR cameras, even if the focal plane slightly deviates from an in-focus position thereof after the user varies the focal length, he or she has only to rotate the distance-scale bearing ring (focusing ring) provided on the lens, so that sharp object images can be viewed through the viewfinder. Therefore, there is practically no problem in focusing of the vari-focal lens.

However, in SLR cameras, since the distance-scale bearing ring needs to be provided thereon with a distance scale so that it can be seen by the user, the camera has to be sharply focused on an object at a distance indicated by the distance scale at each focal length. In other words, when the camera is to be focused on an object at the same distance, the camera has to be sharply focused on the object at different focal lengths by moving the focusing lens group by respective different amounts of movement by rotating the distance-scale bearing ring rotating by the same amount (angle) of rotation as the focusing lens group from, e.g., the infinity photographic position thereof. Accordingly, in this case where the SLR camera is used with a vari-focal lens, the user is required to manipulate the vari-focal lens as if it were a zoom lens with which the focal plane is substantially still even if the focal length varies. In this respect there is no practical difference between vari-focal lenses and zoom lenses. In the present specification and claims, the terms "zoom" and "zooming" will be herein after used so as to mean "vary" and "variation" of the focal length of the vari-focal lens.

Although various types of vari-focal lenses have been proposed and developed, not only are the structures thereof generally complicated, but also it is difficult to remove mutual interference (influence) between focus cams (e.g., cam grooves or slots) for varying the amount of movement of the focusing lens group per unit angle of rotation of the distance-scale bearing ring in accordance with a variation of the focal length, and zoom cams (e.g., cam grooves or slots) for driving a power varying lens or lenses in order to carry out a zooming operation.

SUMMARY OF THE INVENTION

The primary object of the present invention is to provide a vari-focal lens which can zoom without the occurrence of mutual interference between the focus cams and the zoom cams.

To achieve the object mentioned above, according to an aspect of the present invention, a vari-focal lens is provided, including a plurality of power varying lens groups including a focusing lens group, which are guided so as to be movable in a direction of an optical axis of the plurality of power varying lens groups to vary a focal length thereof, the focusing lens group being moved in the optical axis direction by different amounts of movement at different focal lengths, respectively, to bring an object at the same object distance into focus; a zooming ring manually rotated about the optical axis; a focusing ring manually rotated independently of the zooming ring about the optical axis; a focusing lens frame which supports the focusing lens group; an intermediate moving frame which supports the focusing lens frame and is guided so as to be movable in the optical axis direction; a zoom cam ring which moves the intermediate moving frame and each of the plurality of power varying lens groups in the optical axis direction according to a predetermined zoom path when the zooming ring is rotated; a focus cam ring which rotates together with the zoom cam ring about the optical axis and is movable in the optical axis direction relative to the zoom cam ring, the focus cam ring including focus cams for compensating for a deviation of a focal plane from an in-focus position thereof at a focal length determined by a rotational position of the zooming ring; and first cam followers formed on the focusing lens frame and corresponding second cam followers formed on the intermediate moving member, the first cam followers and second cam followers being engaged with the focus cams of the focus cam ring. The focus cam ring moves in the optical axis direction relative to the focusing lens frame and the intermediate moving frame, and at the same time, rotates about the optical axis while being guided by the focus cams to thereby change a position of engagement of the first cam followers and the second cam followers relative to the focus cams.

According to the above construction, zooming can be carried out without the occurrence of mutual interference between the focus cams and the zoom cams.

The intermediate moving frame and the focusing lens frame can move together along the optical axis direction without varying a distance therebetween via the focus cams when the zooming ring is rotated in order to carry out a zooming operation.

In an embodiment, each of the focus cams includes a cam slot formed on the focus cam ring.

In another embodiment, each of the focus cams includes an elongated protrusion formed on the focus cam ring.

In an embodiment, each of the first cam followers and respective corresponding one of the second cam followers are engaged with the corresponding common focus cam from opposite directions in a radial direction of the focus cam ring.

Preferably, the focus cam ring is held between the focusing lens frame and the intermediate moving frame.

In an embodiment, the zoom cam ring includes a plurality of first zoom cams, and the intermediate moving frame includes a corresponding plurality of first zoom followers, each of the first zoom followers being engaged with each respective first zoom cams, so that the intermediate moving frame moves in the optical axis direction when the zoom cam ring is rotated.

In an embodiment, another lens frame is further provided, which supports a corresponding one of the plurality of power varying lens groups. The zoom cam ring includes a plurality of second zoom cams, and the another lens frame includes a corresponding plurality of second zoom followers, each of the second zoom followers being engaged with each respective the second zoom cams, so that the another lens frame moves in the optical axis direction when the zoom cam ring is rotated.

In an embodiment, yet another lens frame is further provided, which supports a corresponding one of the plurality of power varying lens groups. The zoom cam ring includes a plurality of third zoom cams, and the yet another lens frame includes a corresponding plurality of third zoom followers engaged with each respective the third zoom cams, so that the yet another lens frame moves in the optical axis direction when the zoom cam ring is rotated.

According to another aspect of the present invention, a vari-focal lens is provided which requires slight focus adjustment as the vari-focal lens varies the focal length, unless focused on infinity, the vari-focal lens including a plurality of lens groups including a focusing lens group, which are guided in a direction of an optical axis to vary a focal length thereof, the focusing lens group being moved in the optical axis direction by different amounts of movement at different focal lengths, respectively, to bring an object at the same object distance into focus; a zooming ring manually rotated about the optical axis; a focusing ring manually rotated independently of the zooming ring about the optical axis; a focusing lens frame which supports the focusing lens group; an intermediate moving frame which supports the focusing lens frame and is guided in the optical axis direction; a zoom cam ring which rotates together with the zooming ring about the optical axis when the zooming ring is rotated, wherein the zoom cam ring moves the intermediate moving frame and each of the plurality of power varying lens groups in the optical axis direction according to a predetermined zoom path when the zooming ring is rotated; a focus cam ring which rotates together with the zoom cam ring about the optical axis and is movable in the optical axis direction relative to the zoom cam ring, the focus cam ring including focus cams for compensating for a deviation of a focal plane from an in-focus position thereof at a focal length determined by a rotational position of the zooming ring; first cam followers formed on the focusing lens frame; and corresponding second cam followers formed on the intermediate moving member. The focusing lens frame is movable relative to the zoom cam ring and is driven to rotate about the optical axis when the focusing ring is rotated. Each of the first cam followers and respective corresponding one of the second cam followers are engaged with a corresponding common focus cam of the focus cams. The focus cam ring moves in the optical axis direction relative to the focusing lens frame and the intermediate moving frame, and at the same time, rotates about the optical axis while being guided by the focus cams via the first and second cam followers to thereby change a position of engagement of the each first cam follower and the corresponding second cam follower relative to the corresponding common focus cam.

The present disclosure relates to subject matter contained in Japanese Patent Application No.11-192828 (filed on Jul. 7, 1999) which is expressly incorporated herein by reference in its entirety.

BRIEF DESCRIPTION OF THE DRAWINGS

The present invention will be described below in detail with reference to the accompanying drawings in which similar elements are indicated by similar reference numerals, wherein.

DESCRIPTION OF THE PREFERRED EMBODIMENTS

FIGS. 1 through 7 show the first embodiment of a vari-focal lens according to the present invention. This vari-focal lens 10 is an interchangeable lens of an SLR camera system and is provided with a photographic optical system including a first lens group A, a second lens group B, a third lens group C and a fourth lens group D in this order from the object side, i.e., from left to right as viewed in FIG.

1. The first lens group A, the second lens group B, the third lens group C and the fourth lens group D are supported by and fixed to a first lens frame 11, a second focusing lens frame (focusing lens frame) 12, a third lens frame 13 and a fourth lens frame 14, respectively. Each of the first through fourth lens groups A through D functions as a power varying lens group. The second lens group B also functions as a focusing lens group.

The vari-focal lens 10 is provided with a stationary barrel 15 whose rear end is to be coupled to a camera body of an SLR camera system (not shown). The vari-focal lens 10 is provided around the stationary barrel 15 with a zooming ring (zoom operation ring) 20 which can be manually independently rotated about an optical axis O relative to the stationary barrel 15 from the outside of the vari-focal lens 10. The vari-focal lens 10 is provided between the stationary barrel 15 and the zooming ring 20 with a focusing ring (focus operation ring/distance-scale bearing ring) 30 which is manually rotatable about the optical axis O but immovable in the direction of the optical axis O relative to the stationary barrel 15.

The vari-focal lens 10 is provided within the stationary barrel 15 with a zoom cam ring 21 which is fitted in the stationary barrel 15 to be rotatable about the optical axis O but immovable in the optical axis direction relative to the stationary barrel 15. The zooming ring 20 is provided with a connecting arm 20a (see FIG. 1) which extends inwardly in a radial direction to be engaged with an engaging hole formed on an outer periphery of the zoom cam ring 21, so that the zooming ring 20 and the zoom cam ring 21 rotate together equally at any time when the zooming ring 20 is operated to rotate.

The vari-focal lens 10 is provided with an intermediate moving frame 22 which is fitted on the second lens frame 12 to be rotatable about the optical axis O and also movable in the optical axis direction. The zoom cam ring 21 is provided on an outer periphery thereof with a plurality of cam grooves (third zoom cams) 21A (three cam grooves arranged equi-angular distance in the circumferential direction in this particular embodiment; not all the grooves appearing in FIG. 1) for driving the first lens group A. The first lens frame 11 is provided with a corresponding plurality of follower pins (third zoom followers) 11C (three follower pins in this particular embodiment; not all the pins appearing in FIG. 1) whose tip portions are fitted in the plurality of cam grooves 21A, respectively. The zoom cam ring 21 is further provided with a plurality of cam slots (first zoom cams) 21B (three cam slots arranged equi-angular distance in the circumferential direction in this particular embodiment; not all the slots appearing in FIG. 1) for driving the second lens group B via the intermediate moving frame 22. The intermediate moving frame 22 is provided with a corresponding plurality of follower pins (first zoom followers) 22C (three follower pins in this particular embodiment; not all the pins appearing in FIG. 1) which are fitted in the plurality of cam slots 21B, respectively. The zoom cam ring 21 is further provided with a plurality of cam slots (second zoom cams) 21C (three cam slots arranged equi-angular distance in the circumferential direction in this particular embodiment; not all the slots appearing in FIG. 1) for driving the third lens group C. The third lens frame 13 is provided with a corresponding plurality of follower pins (second zoom followers) 13C (three follower pins in this particular embodiment; not all the pins appearing in FIG. 1) which are fitted in the plurality of cam slots 21C, respectively. The vari-focal lens 10 is provided between the intermediate moving frame 22 and the second lens group 12 with a focus cam ring 24 so as to be rotatable about the optical axis O relative to each of the intermediate moving frame 22 and the second lens group 12. The second lens frame 12, which supports the second lens group B, is supported by the intermediate moving frame 22 via the focus cam ring 24.

Figure 1:
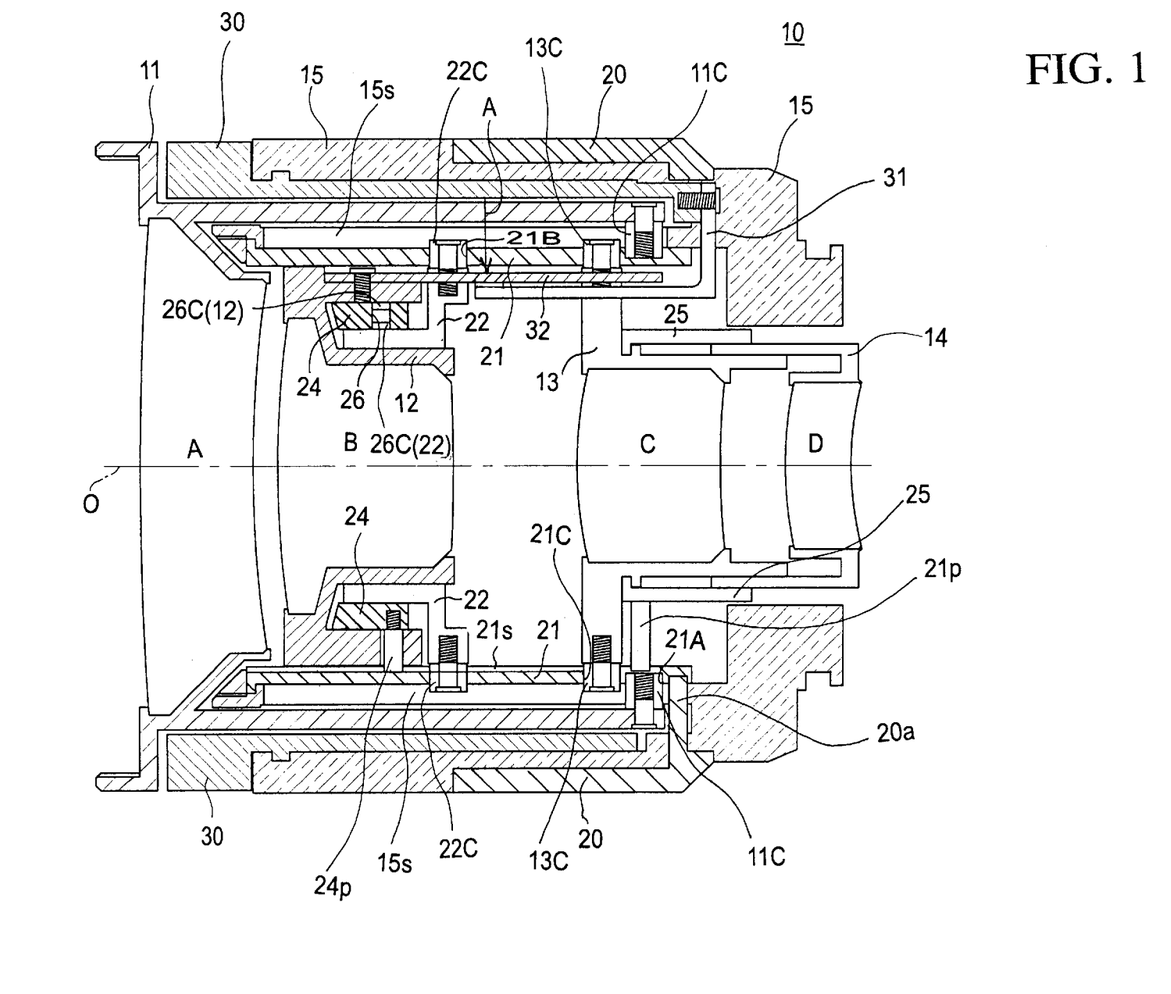
FIG. 1 is a longitudinal cross sectional view of the first embodiment of a vari-focal lens according to the present invention.
Figure 2:
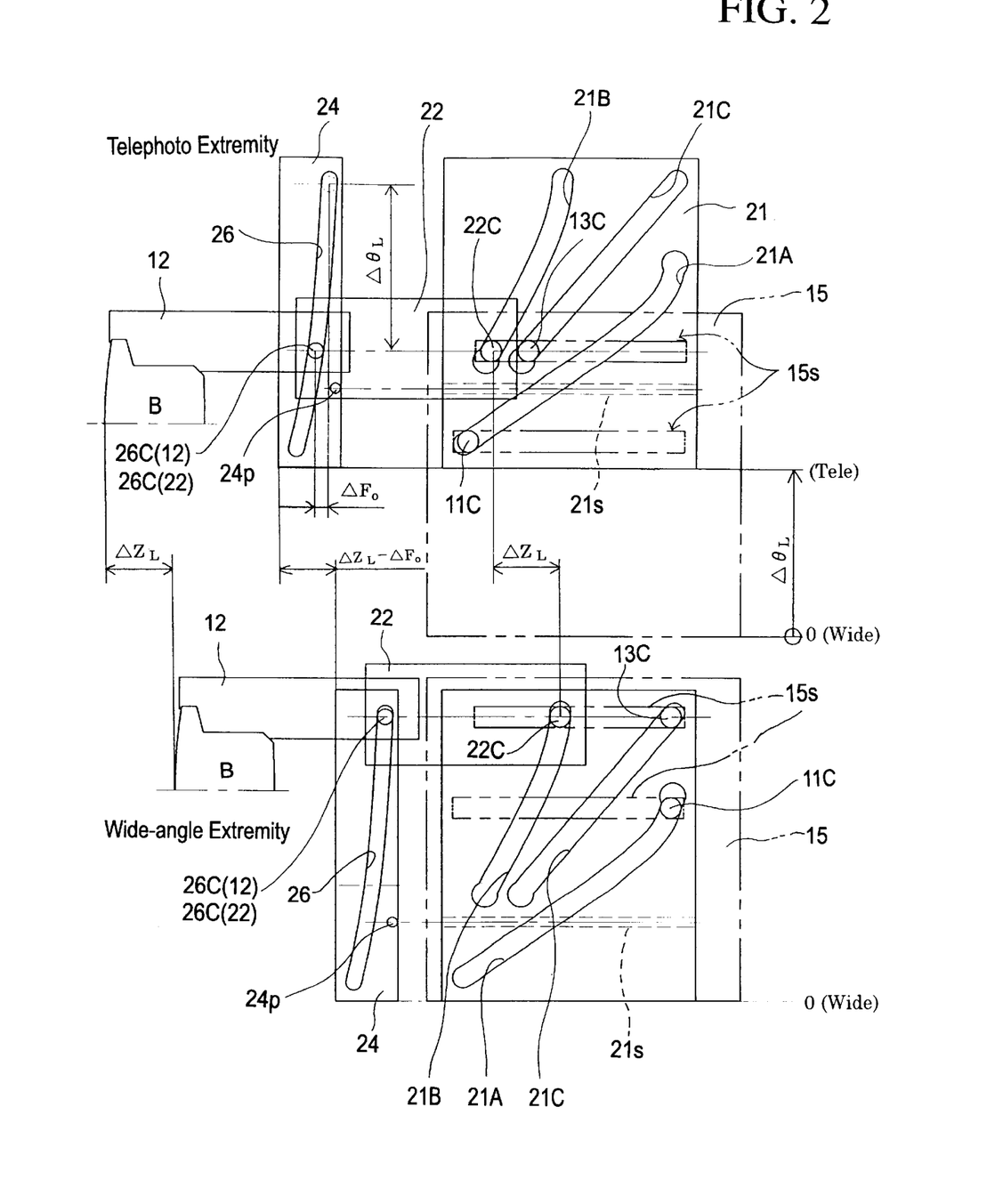
FIG. 2 is an explanatory view of a zoom cam ring, an intermediate moving frame, a focus cam ring and a second lens frame (focusing lens frame) of the vari-focal lens shown in FIG. 1, showing a positional relationship thereamong when the focusing lens group (second lens group) is positioned at an infinite photographic position thereof where an object at infinity is in focus.
Figure 3:
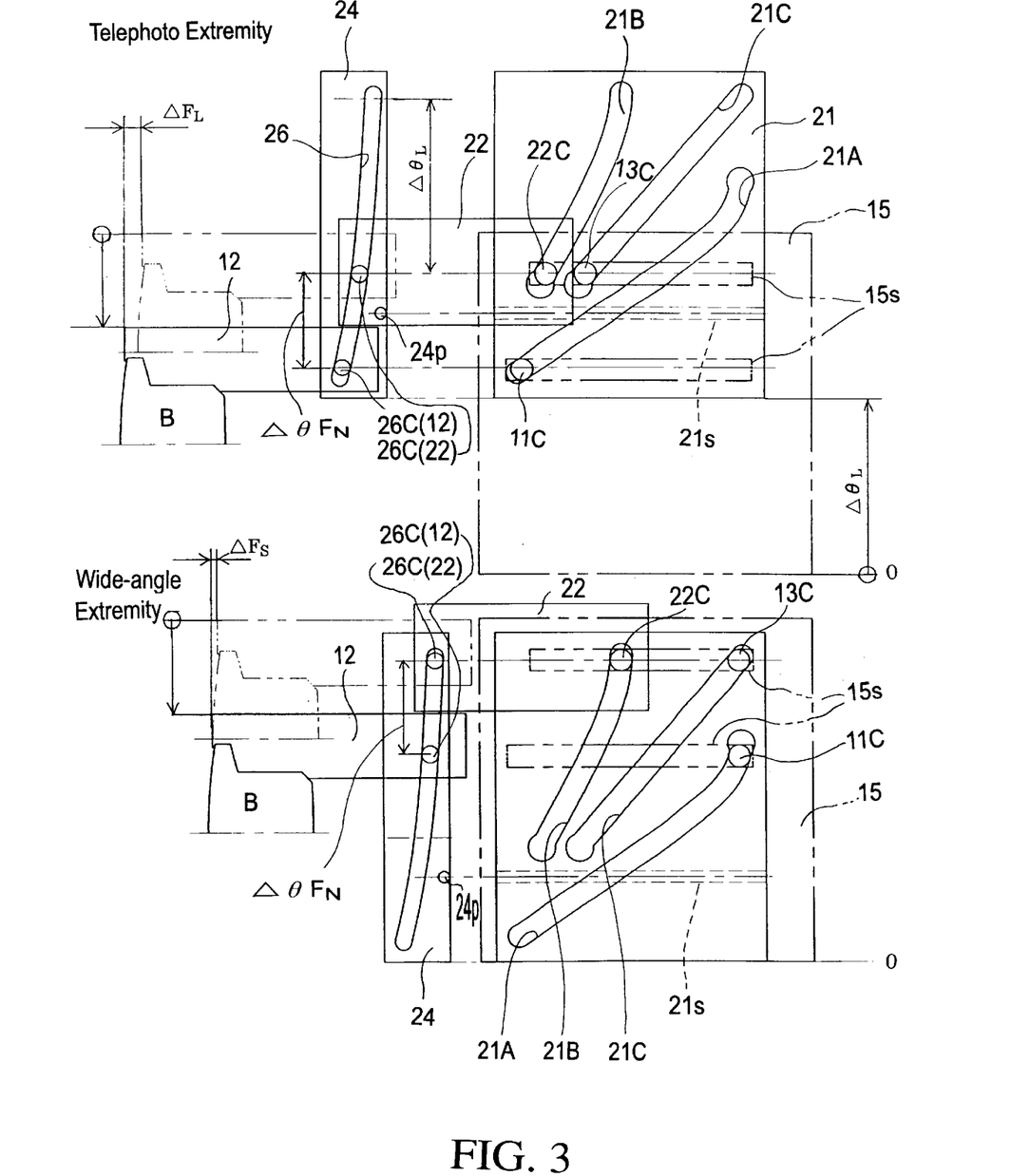
FIG. 3 is an explanatory view of the zoom cam ring, the intermediate moving frame, the focus cam ring and the second lens frame of the vari-focal lens shown in FIG. 1, showing another positional relationship thereamong when the focusing lens group (second lens group) is positioned at a closest photographic position thereof.

The stationary barrel 15 is provided with a plurality of linear guide slots 15s (six slots in this particular embodiment; not all the slots appearing in FIG. 1) each extending parallel to the optical axis O. Each follower pin 11C is engaged with a corresponding linear guide slot 15s; on the other hand, each follower pin 13c and a corresponding follower pin 22C are engaged with a corresponding common linear guide slot 15s as shown in FIGS. 2 and 3. In each of FIGS. 2 and 3, a developed view of the fundamental elements of the focus cam ring 24 and the fundamental elements of the zoom cam ring 21 when the vari-focal lens 10 is set at the telephoto extremity thereof is shown in an upper half of the drawing, while a developed view of the same elements when the vari-focal lens 10 is set at the wide-angle extremity thereof is shown in a lower half of the drawing. These developed views are shown to make it easy to understand the positional relationship among the zoom cam ring 21, the intermediate moving frame 22, the focus cam ring 24 and the second lens frame 12.

As can be seen in FIGS. 2 and 3, the linear guide slots 15s are formed circumferentially at different positions on the stationary barrel 15. Although each follower pin 11C is engaged with a corresponding linear guide slot 15s with which neither the follower pins 13C or 22C are engaged, the drawing of FIG. 1 is illustrated so that a set of follower pins 11C, 13C and 22C are engaged with a common linear guide slot 15s for sake of simplicity.

The vari-focal lens 10 is provided between the stationary barrel 15 and the third lens frame 13 with a cam ring 25 for driving the fourth lens group D which is rotatable about the optical axis O relative to the third lens frame 13. The zoom cam ring 21 is coupled to the cam ring 25 via a connecting pin 21p which projects inwardly and radially from an inner periphery of the zoom cam ring 21 to be secured to the outer periphery of the cam ring 25. Therefore, the cam ring 25 and the zoom cam ring 21 rotate together equally at any time when the zooming ring 20 is operated to rotate. The cam ring 25 is provided with a plurality of cam grooves (not shown) for driving the fourth lens group D. In these cam grooves a corresponding plurality of follower pins (not shown) integrally formed on the fourth lens frame 14 are respectively engaged. The fourth lens frame 14 is guided linearly without rotating about the optical axis O relative to the stationary barrel 15 by the third lens frame 13, so that rotation of the zoom cam ring 21 (and the cam ring 25) causes the fourth lens group D to move along the optical axis in accordance with the contour of the cam grooves formed on the cam ring 25.

Namely, if the zooming ring 20 is operated to rotate, the zoom cam ring 21 and the cam ring 25 also rotate together equally via the connecting arm 20a and the connecting pin 21p. As a result, the first lens frame 11 (the first lens group A), the second lens frame 12 (the second lens group B) and the third lens frame 13 (the third lens group C) are driven along the optical axis O in accordance with the contours of the cam grooves 21A, the cam slots 21B and the cam slots 21C, respectively, while the fourth lens frame 14 (the fourth lens group D) is driven along the optical axis O in accordance with the contour of the cam grooves formed on the cam ring 25 to thereby carry out a zooming operation. In other words, the zoom path of the first through fourth lens groups is determined according to the contours of the cam grooves 21A, the cam slots 21B and the cam slots 21C, and the contour of the cam grooves formed on the cam ring 25, respectively.

The above explanation regarding the zooming operation of the vari-focal lens 10 has been made without regard to the relationship among the intermediate moving frame 22, the focus cam ring 24 and the second lens frame 12 (the second lens group B). As mentioned above, the vari-focal lens 10 is of a type whose focal plane moves (focal shift occurs) slightly as the vari-focal lens 10 zooms. Due to this characteristic, in order to compensate for such a variation in position of the focal plane, when the vari-focal lens 10 is to be focused on an object at the same object distance, the vari-focal lens 10 has to be focused on the object at different focal lengths by moving the second lens group B by respective different amounts of movement. A restrictive condition for when the vari-focal lens 10 is being focused on an object at the same object distance is that the vari-focal lens 10 has to be focused on an object at different focal lengths by moving the focusing lens group by respective different amounts of movement by rotating the focusing ring (distance-scale bearing ring) 30 by the same amount (angle) of rotation as the focusing lens group, as mentioned above.

Structure of the vari-focal lens 10 to achieve such a function will be hereinafter discussed. The zoom cam ring 21 is provided on an inner periphery thereof with a plurality of linear guide grooves 21s (three grooves arranged equi-angular distance in the circumferential direction in this particular embodiment; not all the grooves appearing in FIG. 1) which extend parallel to the optical axis O. The focus cam ring 24 is provided with a corresponding plurality of guide pins 24p (three pins in this particular embodiment; not all the pins appearing in FIG. 1) which extend outwardly radially to be fitted in the plurality of linear guide grooves 21s, respectively, so that each pin 24p can slide relative to the corresponding linear guide groove 21s therealong. Due to this structure, the focus cam ring 24 rotates about the optical axis O together with the zoom cam ring 21 equally at any time when the zoom cam ring 21 rotates, and at the same time, the focus cam ring 24 can move in the optical axis direction relative to the zoom cam ring 21.

The focus cam ring 24 is provided with a plurality of focus cam slots (focus cams) 26 (three slots arranged equi-angular distance in the circumferential direction in this particular embodiment; not all the slots appearing in FIG. 1). A corresponding plurality of follower protrusions (first cam followers) 26C(12) (three protrusions in this particular embodiment; not all the protrusions appearing in FIG. 1) protruded from the second lens frame 12 and also a corresponding plurality of follower protrusions (second cam followers) 26C(22) (three protrusions in this particular embodiment; not all the protrusions appearing in FIG. 1) protruded from the intermediate moving frame 22 are fitted in the plurality of focus cam slots 26 from the outside of the focus cam ring 24 and the inside of the focus cam ring 24, respectively. Accordingly, each of the follower protrusions 26C(12) and a corresponding respective follower protrusion 26C(22) are fitted in a corresponding common one of the plurality of focus cam slots 26 from the outside of the focus cam ring 24 and the inside of the focus cam ring 24, respectively.

Figure 11:
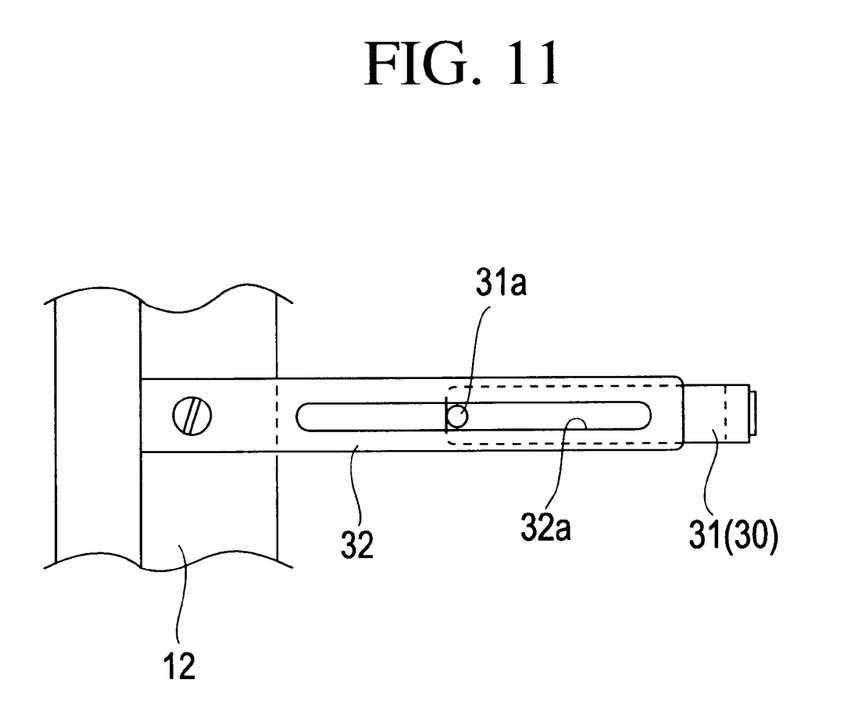
FIG. 11 is a plan view of a portion of a focusing mechanism as viewed in the direction of arrow A of FIG. 1.

The vari-focal lens 10 is provided therein with a focus lever 31 and a relay bar 32 for connecting the focusing ring 30 with the second lens frame 12. One end of the focus lever 31 is fixed at the rear end of the focusing ring 30, while the other end of the focus lever 31 is engaged with the relay bar 32 as shown in FIG. 11. A pin 31a which protrudes from the focus lever 31 engages with an elongated slot 32a of the relay bar 32 to be slidable therealong in the optical axis direction. The front end of the relay bar 32 is fixed to the second lens frame 12. Due to this structure, the rotational movement of the focusing ring 30 is transmitted to the second lens frame 12 wherein the second lens frame 12 rotates together with the focusing ring 30 equally, while the second lens frame 12 is allowed to move in the direction of the optical axis.

The operation of the vari-focal lens 10 according to the present invention will be hereinafter discussed. If the zooming ring 20 is operated to rotate in the full zoom range between the telephoto extremity and the wide-angle extremity, the zoom cam ring 21, which rotates together with the zooming ring 20, rotates about the optical axis between a telephoto-extremity (shown in the upper half of the drawing in each of FIGS. 2 and 3) and a wide-angle-extremity (shown in the lower half of the drawing in each of FIGS. 2 and 3) while rotating about the optical axis O. The maximum amount of rotational distance (angle of rotation) of the zoom cam ring 21 between the telephoto-extremity and the wide-angle-extremity is given by $\Delta\theta L$. If the zoom cam ring 21 rotates, the zoom cam ring 21 does not move in the optical axis direction relative to the stationary barrel 15. Conversely, when the zoom cam ring 21 rotates, the intermediate moving frame 22, which bears the follower pins 22C and is guided linearly without rotating about the optical axis O, moves in the optical axis direction by an amount of movement $\Delta Z_L$ in accordance with the contour of the cam slots 21B. At this time, the relative rotational position between the focus cam ring 24 and the zoom cam ring 21 is always the same due to the engagement of the guide pins 24p with the linear guide grooves 21s. Since the follower protrusions 26C(12) of the second lens frame 12 are fitted in the focus cam slots 26 of the focus cam ring 24, the second lens frame 12 moves in the optical axis direction while rotating about the optical axis O in accordance with the contour of the focus cam slots 26 if the second lens frame 12 is driven to rotate via the relay bar 32 because the focus cam ring 24 does not rotate. The maximum angle of rotation of the focus cam ring 24 between an infinite photographic position and a closest photographic position is $\Delta\theta F_N$ shown in FIG. 3 that is constant regardless of the rotational position of the zooming ring 20.

Considering that the second lens frame 12 (the second lens group B) is positioned at the infinite photographic position when the zooming ring 20 (the zoom cam ring 21) is positioned at the wide-angle extremity (a state shown in the lower half of FIG. 2), a corresponding pair of follower protrusions 26C(12) and 26C(22) are fitted in a corresponding one of the plurality of the focus cam grooves 26 from opposite radial directions at one end (the upper end as viewed in FIG. 2) of the corresponding one focus cam groove 26, namely, at a common circumferential position of the corresponding one focus cam groove 26. In this state where the second lens frame 12 is positioned at the infinite photographic position while the zooming ring 20 is positioned at the wide-angle extremity, if the focusing ring 30 is operated to rotate, the second lens frame 12 (which bears the follower protrusions 26C(12)) rotates relative to the focus cam ring 24 (which bears the focus cam grooves 26) which is in a stationary state, so that the second lens frame 12 moves in the optical axis direction while rotating about the optical axis O in accordance with the contour of the focus cam grooves 26. In a state where the zooming ring 20 is positioned at the wide-angle extremity, the amount of movement of the second lens frame 12 in the optical axis direction when the focusing ring 30 rotates from the infinite photographic position to the closest photographic position by the maximum angle of rotation $\Delta\theta F_N$ is $\Delta F_S$ (see the lower half of FIG. 3).

If the zooming ring 20 is operated to rotate from the wide-angle extremity to the telephoto extremity, the zoom cam ring 21 rotates from the wide-angle-extremity (shown in the lower half of FIG. 2) to the telephoto-extremity (shown in the upper half of FIG. 2) to thereby advance the first lens frame 11 (the first lens group A), the intermediate moving frame 22 (the second lens group B) and the third lens frame 13 (the third and fourth lens groups C and D) in the optical axis direction in accordance with the contours of the cam grooves 21A, the cam slots 21B and the cam slots 21C, respectively. Rotation of the zoom cam ring 21 causes the focus cam ring 24 to rotate by the same angle of rotation due to the engagement of the guide pins 24p with the linear guide grooves 21s. This rotation of the focus cam ring 24 causes the intermediate moving frame 22, which has the follower pins 22C engaged with the cam slots 21B, to advance in the optical axis direction in accordance with the contour of the cam slots 21B. At this time, since the follower protrusions 26C(12) are fitted in the focus cam slots 26 of the focus cam ring 24, the second lens frame 12 advances in the optical axis direction by the same amount of movement as that of the intermediate moving frame 22. The amount of forward movement of each of the second lens frame 12 and the intermediate moving frame 22 at this time due to the rotation of the zoom cam ring 21 is given by $\Delta Z_L$ (see FIG. 2). This amount of forward movement of the second lens frame 12 (which carries the second lens group B) due to the rotation of the zoom cam ring 21 is determined by only the contour of the cam slots 21B, which are formed on the zoom cam ring 21 to drive the second lens group B, without being influenced by the focus cam slots 26. In other words, the contour of the cam slots 21B is determined with reference to an object at infinity which is to be focused by the movement of the second lens group (focusing lens group) B.

On the other hand, when rotating from a wide-angle extremity (shown in the lower half of FIG. 2) to a telephoto extremity (shown in the upper half of FIG. 2) by the same amount of rotation as that of the zoom cam ring 21, the focus cam ring 24 retreats in the optical axis direction with respect to the intermediate moving frame 22 by an amount of movement $\Delta F_0$ in accordance with the contour of the focus cam slots 26. Accordingly, the focus cam ring 24 advances by an amount of movement "$\Delta Z_L - \Delta F_0$", whereas the intermediate moving frame 22 and the second lens frame 12 advance together by an amount of movement $\Delta Z_L$. Hence, the second lens frame 12 and the intermediate moving frame 22 maintain the distance therebetween in the optical axis direction.

Thereafter, if the focus cam ring 24 rotates, the positions of the follower protrusions 26C(12) relative to the corresponding focus cam slots 26 vary, so that the maximum range of rotation of the focus cam ring 24 ($\Delta\theta F_N$) in each focus cam slot 26 when the focusing ring 30 is operated to rotate for focusing varies (see FIG. 3). Therefore, if the contour of the focus cam slots 26 is appropriately designed, the second lens frame 12 (which carries the second lens group B) can be driven to move in the optical axis direction by different amounts of movement at different respective focal lengths by rotating the focusing ring 30 by the same amount (angle) of rotation. This makes it possible to bring an object into focus while compensating for a slight deviation of the focal plane (focal shift) from an in-focus position thereof as the vari-focal lens 10 zooms (i.e., as the focal length varies).

Although the above operations of the vari-focal lens 10 are those when the zooming ring 20 is operated to rotate from the wide-angle extremity to the telephoto extremity, the maximum range or rotation of the focus cam ring 24 (the maximum angle of rotation of the focus cam ring 24 $\Delta\theta F_N$) in each focus cam slot 26 when the focusing ring 30 is operated to rotate for focusing can be made to vary when the zooming ring 20 is operated to rotate from one intermediate position to another intermediate position, between the wide-angle extremity and the telephoto extremity. The contour of the focus cam slots 26 has to be appropriately designed to realize such operations.

The above discussion has been made for the case of bringing an object at infinity into focus. In this case, the circumferential positions of each corresponding pair of follower protrusions 26C(12) and 26C(22) are coincident with each other at all times as shown in FIG. 2. On the other hand, in the case of bringing an object at a finite distance into focus, only the follower protrusion 26C(12) moves relative to the corresponding follower protrusion 26C(22) in each focus cam slot 26, so that the follower protrusion 26C(12) is positioned apart from the corresponding follower protrusion 26C(22) in a circumferential direction. In this state, if the zooming ring 20 is operated to rotate to carry out a zooming operation, the focus cam ring 24 rotates together with the zooming ring 20 via the zoom cam ring 21 as mentioned above. However, this motion is slightly different from that in the above-mentioned case of bringing an object at infinity into focus because the two follower protrusion 26C(12) and 26C(22) are positioned apart from each other in each focus cam slot 26 in a circumferential direction. During the zooming operation, the movement of the follower protrusions 26C(22) is restricted by the cam slots 21B, with which the follower pins 22C are engaged, whereas the movement of the follower protrusions 26C(12) is not restricted by any cam groove or slots. Therefore, the focus cam ring 24 rotates in accordance with the movement of the follower protrusions 26C(22) during zooming, while the follower protrusions 26C(12) are guided in the optical axis direction by the focus cam slots 26 to move therealong. This varies the position of the second lens frame (focusing lens frame) 12 relative to the intermediate moving frame 22 to move the second lens frame 12 (the second lens group B) to an in-focus position corresponding to the focal length determined by the rotational position of the zooming ring 20 relative to the stationary barrel 15. Namely, even if the user manually rotates the zooming ring 20 in order to carry out a zooming operation with the vari-focal lens 10 being sharply focused on an object at a finite distance, the vari-focal lens 10 can zoom to vary the focal length while maintaining an in-focus state on the object.

A method of determining the contour of the focus cam slots 26 will be hereinafter discussed with reference to FIGS. 4 through 7.

Figure 4:
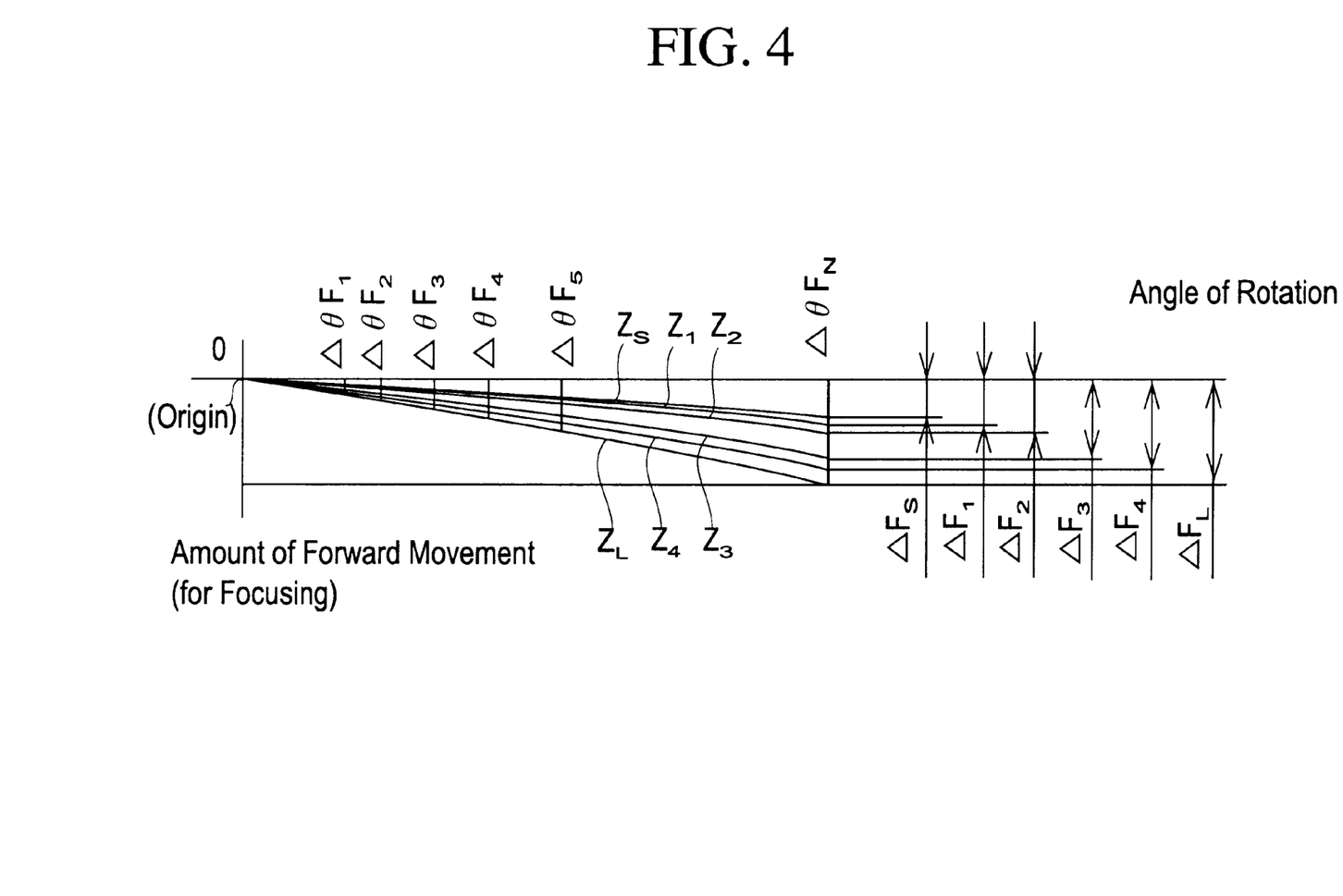
FIG. 4 is a graph showing the relationship between the angle of rotation of the focusing ring and the amount of forward movement of the second lens group of the vari-focal lens for focusing shown in FIG. 1 at different focal lengths, wherein the graph is used to determine the contour of each focus cam slot formed on the focus cam ring.
Figure 5:
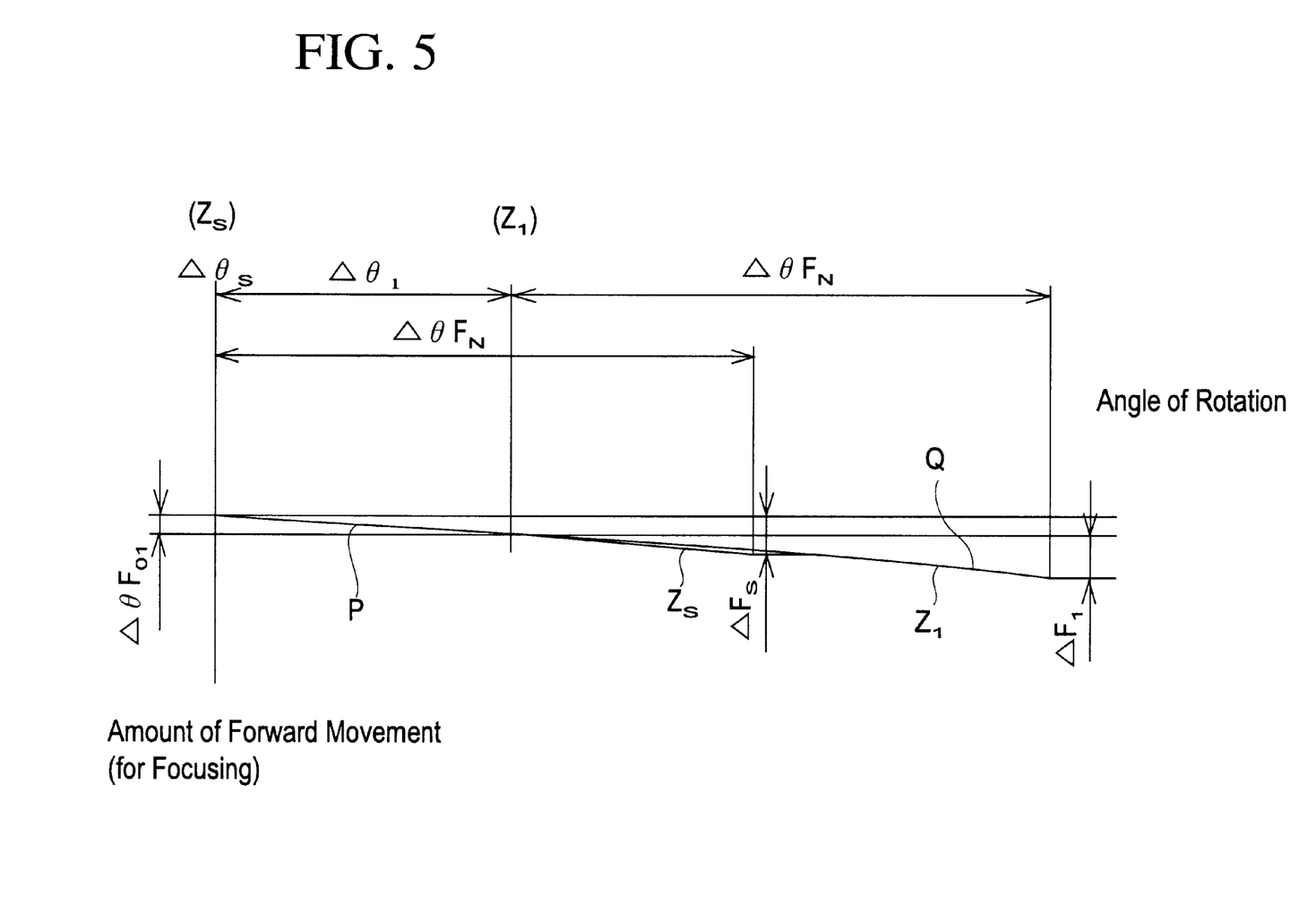
FIG. 5 is an explanatory view showing a method of arranging variation curves at different focal lengths shown in FIG. 4 so that each variation curve corresponds to the angle of rotation of the zooming ring at a corresponding focal length, so as to make a combination graph of variation curves shown in FIG. 6.
Figure 6:
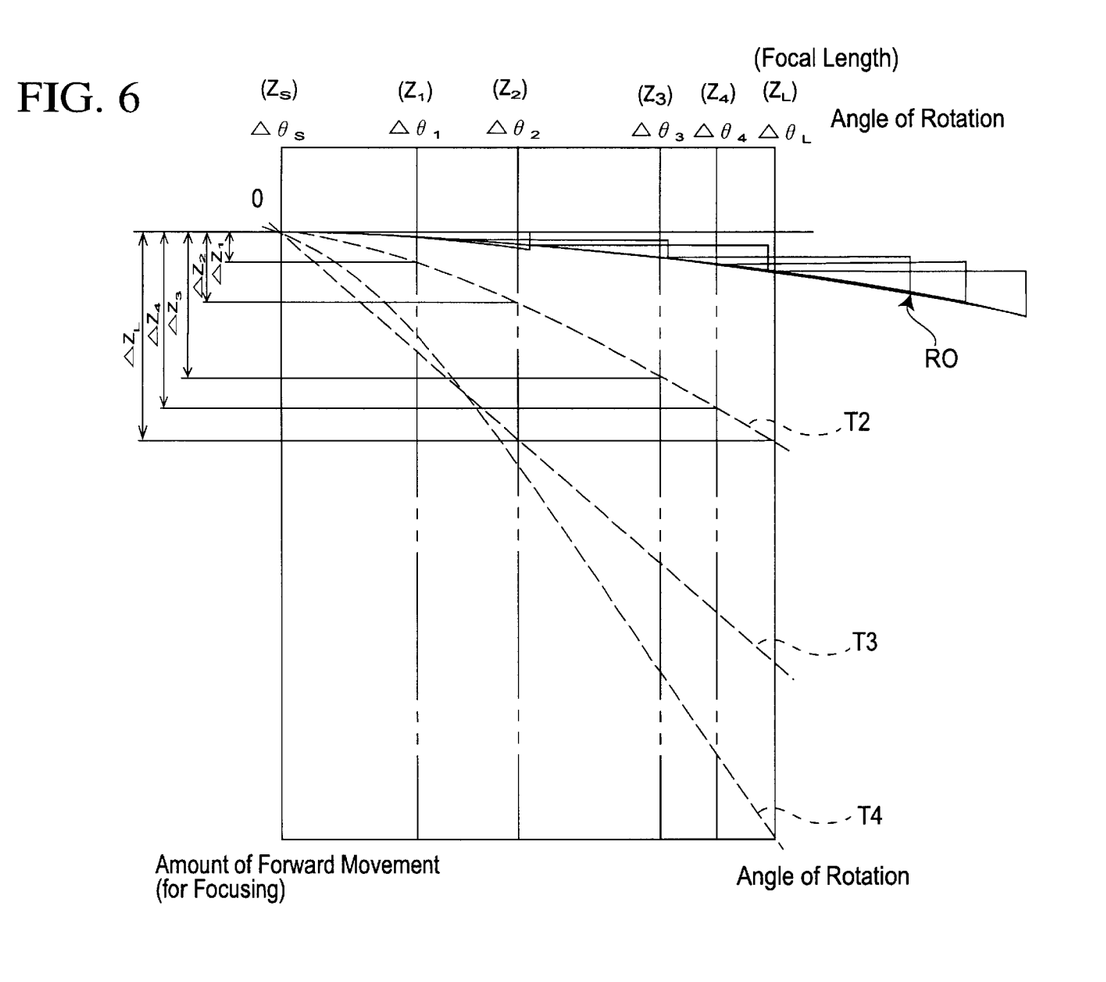
FIG. 6 is a graph showing the relationship the angle of rotation of the zooming ring (zoom cam ring) and the amount of forward movement of the second lens group of the vari-focal lens for focusing shown in FIG. 1 at different focal lengths and also the relationship between the angle of rotation of the focusing ring and the amount of movement of each of the first, second and third lens groups.
Figure 7:
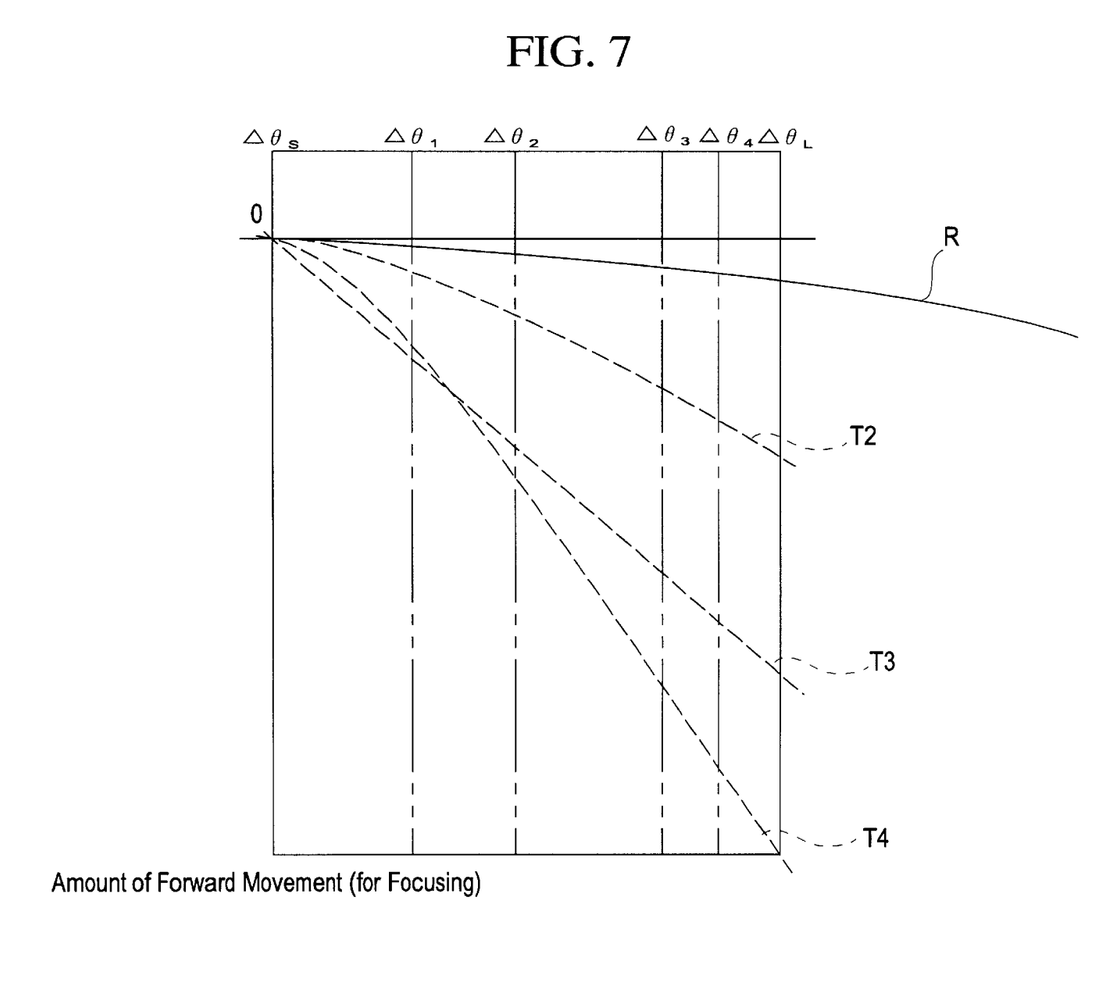
FIG. 7 is a graph showing the relationship the angle of rotation of the zooming ring (zoom cam ring) and the amount of forward movement of the second lens group of the vari-focal lens for focusing shown in FIG. 1 at different focal lengths and also the relationship between the angle of rotation of the focusing ring and the amount of movement of each of the first, second and third lens groups.

FIG. 4 is a graph showing the relationship between the angle of rotation ($\Delta\theta F_1$, $\Delta\theta F_2$, $\Delta\theta F_3$, $\Delta\theta F_4$, $\Delta\theta F_5$, $\Delta\theta F_S$, and $\Delta\theta F_N$) of the focusing ring 30 and the amount of forward movement ($\Delta F_S$, $\Delta F_1$, $\Delta F_2$, $\Delta F_3$, $\Delta F_4$ and $\Delta F_L$) of the second lens frame 12 (the second lens group B) for focusing between an infinite photographic position and a closest photographic position thereof at different focal lengths $Z_S$, $Z_1$, $Z_2$, $Z_3$, $Z_4$ and $Z_L$. In FIG. 4, six different variation curves which extend from the origin "0" of the graph that represents the infinite photographic position at which the amount of forward movement of the second lens frame 12 is zero are obtained at the six different focal lengths $Z_S$, $Z_1$, $Z_2$, $Z_3$, $Z_4$ and $Z_L$, respectively. In this graph, the focal lengths $Z_S$ and $Z_L$ are of the wide-angle extremity and the telephoto extremity, respectively, while the remaining four focal lengths $Z_1$, $Z_2$, $Z_3$ and $Z_4$ are of different intermediate positions between the wide-angle extremity and the telephoto extremity. If the variation curves obtained in the graph shown in FIG. 4 at the corresponding different focal lengths $Z_S$, $Z_1$, $Z_2$, $Z_3$, $Z_4$ and $Z_L$ are arranged to correspond to the corresponding angles of rotation ($\Delta\theta_S$, $\Delta\theta_1$, $\Delta\theta_2$, $\Delta\theta_3$, $\Delta\theta_4$ and $\Delta\theta_L$) of the zooming ring 20, respectively, a graph shown in FIG. 6 is obtained. FIG. 6 shows the relationship between the angle of rotation of the zooming ring 20 and the moving paths of the first, second and third lens groups A, B and C in the optical axis direction, wherein "T2", "T3" and "T4" represent the moving paths of the second, third and first lens groups B, C and A, respectively. The graph shown in FIG. 6 is made according to a method of arranging the variation curves obtained in the graph shown in FIG. 4, wherein, in the case of arranging, e.g., two variation curves P and Q (see FIG. 5) respectively obtained at focal lengths $Z_S$ and $Z_1$, firstly the variation curve P is arranged so that the origin thereof (i.e., the left end thereof as viewed in FIG. 5) coincides with a position on the graph which corresponds to the corresponding angle or rotation A Os of the zooming ring 20, i.e., the origin of the graph. Secondly, the variation curve Q is arranged so that the origin thereof (i.e., the left end thereof as viewed in FIG. 5) coincides with a position on the graph which corresponds to the corresponding angle or rotation $\Delta\theta1$ of the zooming ring 20. The same operation is carried out for each of the remaining four variation curves obtained at focal lengths $Z_2$, $Z_3$, $Z_4$ and $Z_L$, respectively. As a result, a combination graph R of the six variation curves is obtained. Thereafter, by connecting all the origins of the six variation curves by a single line, a continuous composite graph R of the six variation curves which represents the amount of forward movement of the second lens frame 12 (the second lens group B) for focusing is obtained. In each of FIGS. 6 and 7, the horizontal axis which represents the angle of rotation of the zooming ring 20 is designed and graduated so that the continuous composite graph R becomes a smooth curve.

If the continuous composite graph R is regarded as the contour of each focus cam slot 26, it is possible to make the second lens frame 12 (the second lens group B) move in the aforementioned manner. Since the continuous composite graph R is obtained by connecting all the origins of the six variation curves (i.e., all the infinite photographic positions of the second lens frame 12 (the second lens group B) at the six different focal lengths $Z_S$, $Z_1$, $Z_2$, $Z_3$, $Z_4$ and $Z_L$, respectively), the precise in-focus position of the second lens frame 12 (the second lens group B) can be maintained over the full zoom range when the vari-focal lens 10 is in-focus on an object at infinity. On the other hand, when the vari-focal lens 10 is in-focus on an object at a finite distance, since the continuous composite graph R is drawn in a manner to represent an approximate amount of forward movement of the second lens frame 12 (the second lens group B) for focusing at each focal length, there is a slight error in the approximate amount of forward movement of the second lens frame 12 (the second lens group B) for focusing at each focal length. In order to make this error minimal within a tolerable range (depth of field), the contour of the focus cam slots 26 is designed so that the maximum angle of rotation of the focus cam ring 24 $\Delta\theta F_N$ when the focusing ring 30 is operated to rotate for focusing varies. Accordingly, due to the contour of the focus cam slots 26 which is designed in such a manner, by varying the maximum angle of rotation of the focus cam ring 24 $\Delta\theta F_N$, when the second lens frame 12 (which carries the second lens group B) can be driven to move to a precise in-focus position with no positional error at all times over the full zoom range in the case of focusing the vari-focal lens 10 on an object at infinity, while the same can be driven to move to a substantially in-focus position within depth of field at all times over the full zoom range in the case of focusing the vari-focal lens 10 on an object at a finite distance.

It should be noted that the focusing ring 30 has only to be driven by motor to rotate by an angle of rotation based on an amount of defocus detected by, e.g., a phase-difference detection type of AF sensor if the vari-focal lens 10 is used as an AF lens. The angle of rotation of the focusing ring 30 based on an amount of defocus is constant at each focal length over the full zoom range if the amount of defocus is the same.

Figure 8:
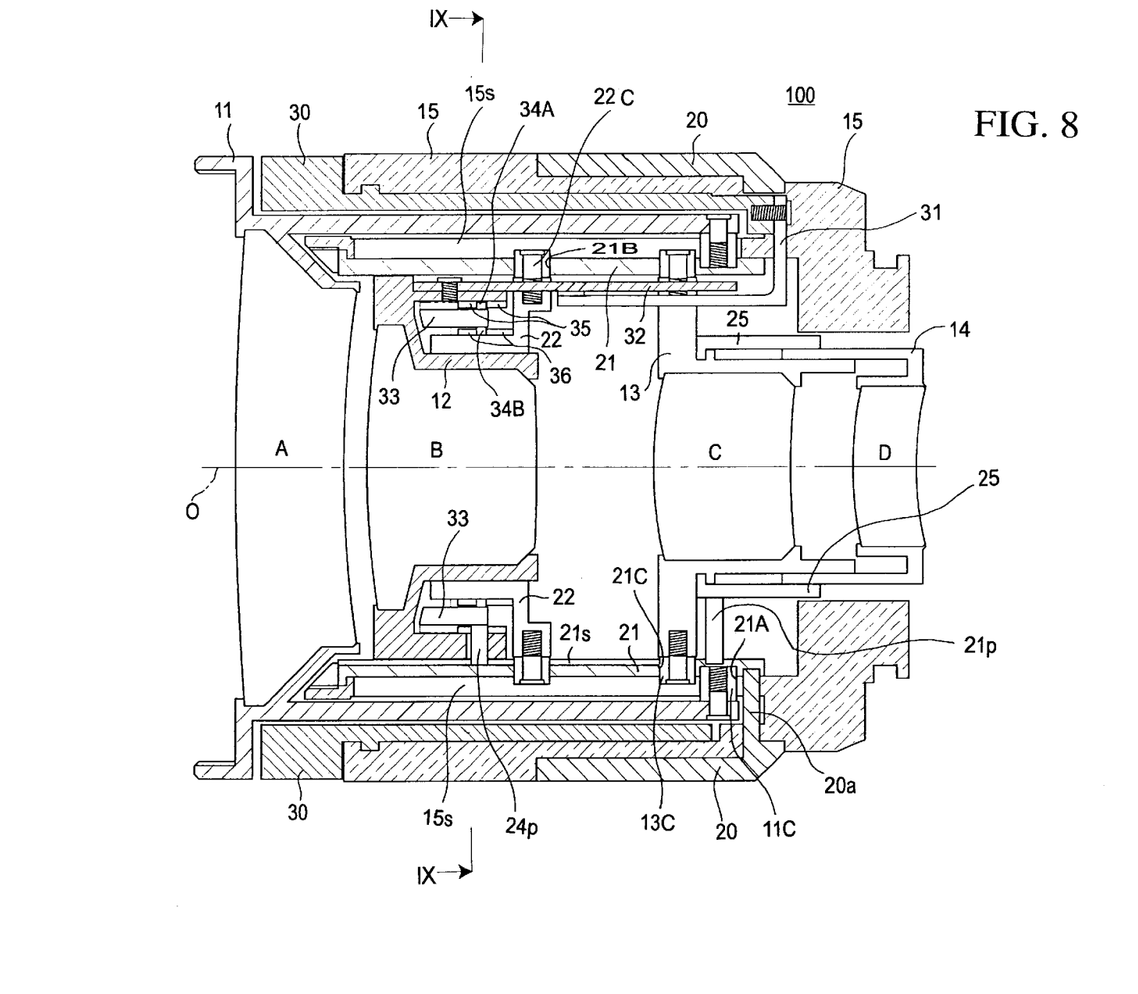
FIG. 8 is a longitudinal cross sectional view of the second embodiment of the vari-focal lens according to the present invention.
Figure 9:
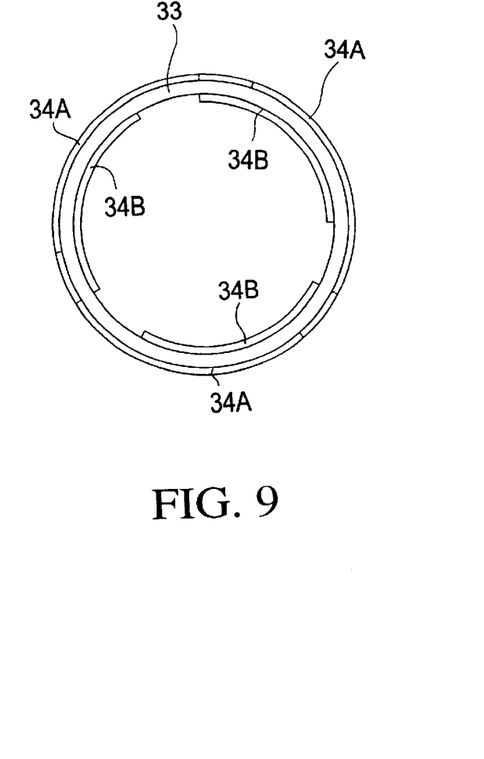
FIG. 9 is a cross sectional view of the focus cam ring provided in the vari-focal lens shown in FIG. 8, taken along IX—IX line shown in FIG. 8, looking in the direction of the appended arrows.
Figure 10:
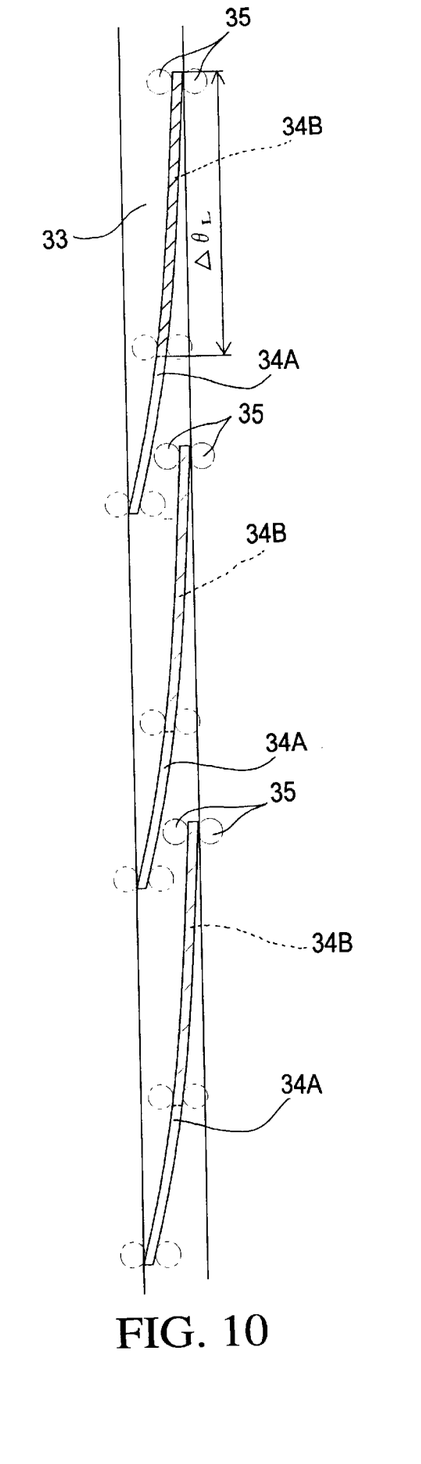
FIG. 10 is a developed view of the focus cam ring provided in the vari-focal lens shown in FIG. 8, showing the relationship between focus cam protrusions formed on the focus cam ring and corresponding follower protrusions.

In the above-mentioned embodiment of the vari-focal lens 10, although the focus cam slots 26 are formed on the focus cam ring 24, elongated protrusions (i.e., focus cam protrusions) corresponding to the focus cam slots 26 can be formed on the focus cam ring instead of the focus cam slots 26. FIGS. 8 through 10 show the second embodiment of a vari-focal lens 100 having a focus cam ring 33 (which corresponds to the focus cam ring 24 of the first embodiment) provided thereon with such elongated protrusions. The second embodiment of the vari-focal lens 100 is substantially identical to the first embodiment of the vari-focal lens 10 shown in FIG. 1 except for peripheral structure of the elongated protrusions, so that elements of the vari-focal lens 100 which are similar to those of the vari-focal lens 10 are indicated by the same reference numerals and are not hereinafter discussed.

The focus cam ring 33, which corresponds to the focus cam ring 24 of the first embodiment, is provided on an outer periphery and an inner periphery thereof with a plurality of outer elongated protrusions (focus cams) 34A (three protrusions arranged equi-angular distance in the circumferential direction in this particular embodiment) and a corresponding plurality of inner elongated protrusions (focus cams) 34B (three protrusions in this particular embodiment), respectively. The contour of each outer elongated protrusion 34A corresponds to the contour of each focus cam slot 26 of the first embodiment of the vari-focal lens 10, whereas the contour of each inner elongated protrusion 34B corresponds to the contour of only a portion (each shaded part shown in FIG. 10) of each focus cam slot 26 of the first embodiment, which corresponds to the maximum angle of rotation of the zoom cam ring 21 $\Delta\theta_L$ between the telephoto-extremity and the wide-angle-extremity. Each outer elongated protrusion 34A is held between a corresponding pair of follower protrusions (first cam followers) 35 protruded from the second lens frame 12 instead of the corresponding follower protrusion 26C(12) of the first embodiment so that each pair of follower protrusions 35 are slidably guided along the corresponding outer elongated protrusion 34A. On the other hand, each inner elongated protrusion 34B is held between a corresponding pair of follower protrusions (second cam followers) 36 formed on an outer periphery of the intermediate moving frame 22 instead of the corresponding follower protrusion 26C(22) of the first embodiment so that each pair of follower protrusions 36 are slidably guided along the corresponding inner elongated protrusion 34B. All the three follower protrusions 35 are formed at an equi-angular distance (i.e., at intervals of 120 degrees) circumferentially on the second lens frame 12. Similarly, all the three follower protrusions 36 are formed at an equi-angular distance (i.e., at intervals of 120 degrees) circumferentially on the intermediate moving frame 22. Accordingly, the second lens frame 12 and the intermediate moving frame 22 of the vari-focal lens 100 operate with the follower protrusions 35 and 36 being guided by the outer and inner elongated protrusions 34A and 34B therealong, respectively, in a similar manner to the first embodiment of the vari-focal lens 10 using the focus cam slots 26.

According to the second embodiment of the vari-focal lens 100 using the outer and inner elongated protrusions 34A and 34B instead of the cam slots 26 of the first embodiment, the focus cam ring 33 can be molded of, e.g., a synthetic resin with the use of simple molds. This makes it possible to reduce the dispersion in overall accuracy of vari-focal lenses. Furthermore, since the focus cam ring 33 can be molded with simple molds, the cost of production can be reduced.

As can be understood from the foregoing, according to the vari-focal lens to which the present invention is applied, the focus cam slots 26 (or outer and inner elongated protrusions 34A and 34B) and the zoom cams (21A, 21B and 21C) do not interfere with each other.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A vari-focal lens comprising:
   a plurality of power varying lens groups including a focusing lens group, which are guided so as to be movable in a direction of an optical axis of said plurality of power varying lens groups to vary a focal length thereof, said focusing lens group being moved in said optical axis direction by different amounts of movement at different focal lengths, respectively, to bring an object at the same object distance into focus;
   a zooming ring manually rotated about said optical axis;
   a focusing ring manually rotated independently of said zooming ring about said optical axis;
   a focusing lens frame which supports said focusing lens group;
   an intermediate moving frame which supports said focusing lens frame and is guided so as to be movable in said optical axis direction;
   a zoom cam ring which moves said intermediate moving frame and each of said plurality of power varying lens groups in said optical axis direction according to a predetermined zoom path when said zooming ring is rotated;
   a focus cam ring which rotates together with said zoom cam ring about said optical axis and is movable in said optical axis direction relative to said zoom cam ring, said focus cam ring comprising focus cams for compensating for a deviation of a focal plane from an in-focus position thereof at a focal length determined by a rotational position of said zooming ring; and
   first cam followers formed on said focusing lens frame and corresponding second cam followers formed on said intermediate moving member, said first cam followers and second cam followers being engaged with said focus cams of the focus cam ring;
   wherein said focus cam ring moves in said optical axis direction relative to said focusing lens frame and said intermediate moving frame, and at the same time, rotates about said optical axis while being guided by said focus cams to thereby change a position of engagement of said first cam followers and said second cam followers relative to said focus cams.

2. The vari-focal lens according to claim 1, wherein said intermediate moving frame and said focusing lens frame move together along said optical axis direction without varying a distance therebetween via said focus cams when said zooming ring is rotated in order to carry out a zooming operation.

3. The vari-focal lens according to claim 1, wherein each of said focus cams comprises a cam slot formed on said focus cam ring.

4. The vari-focal lens according to claim 1, wherein each of said focus cams comprises an elongated protrusion formed on said focus cam ring.

5. The vari-focal lens according to claim 1, wherein said each of said first cam followers and respective said corresponding one of said second cam followers are engaged with said corresponding common focus cam from opposite directions in a radial direction of said focus cam ring.

6. The vari-focal lens according to claim 1, wherein said focus cam ring is held between said focusing lens frame and said intermediate moving frame.

7. The vari-focal lens according to claim 6, wherein said zoom cam ring comprises a plurality of first zoom cams, and wherein said intermediate moving frame comprises a corresponding plurality of first zoom followers, each of said first zoom followers being engaged with each respective said first zoom cams, so that said intermediate moving frame moves in said optical axis direction when said zoom cam ring is rotated.

8. The vari-focal lens according to claim 7, further comprising another lens frame which supports a corresponding one of said plurality of power varying lens groups;
   wherein said zoom cam ring comprises a plurality of second zoom cams, and wherein said another lens frame comprises a corresponding plurality of second zoom followers, each of said second zoom followers being engaged with each respective said second zoom cams, so that said another lens frame moves in said optical axis direction when said zoom cam ring is rotated.

9. The vari-focal lens according to claim 8, further comprising yet another lens frame which supports a corresponding one of said plurality of power varying lens groups;
   wherein said zoom cam ring comprises a plurality of third zoom cams, and wherein said yet another lens frame comprises a corresponding plurality of third zoom followers engaged with each respective said third zoom cams, so that said yet another lens frame moves in said optical axis direction when said zoom cam ring is rotated.

10. A vari-focal lens which requires slight focus adjustment as said vari-focal lens varies the focal length, unless focused on infinity, said vari-focal lens comprising:
    a plurality of lens groups including a focusing lens group, which are guided in a direction of an optical axis to vary a focal length thereof, said focusing lens group being moved in said optical axis direction by different amounts of movement at different focal lengths, respectively, to bring an object at the same object distance into focus;
    a zooming ring manually rotated about said optical axis;
    a focusing ring manually rotated independently of said zooming ring about said optical axis;

a focusing lens frame which supports said focusing lens group;

an intermediate moving frame which supports said focusing lens frame and is guided in said optical axis direction;

a zoom cam ring which rotates together with said zooming ring about said optical axis when said zooming ring is rotated, wherein said zoom cam ring moves said intermediate moving frame and each of said plurality of power varying lens groups in said optical axis direction according to a predetermined zoom path when said zooming ring is rotated;

a focus cam ring which rotates together with said zoom cam ring about said optical axis and is movable in said optical axis direction relative to said zoom cam ring, said focus cam ring comprising focus cams for compensating for a deviation of a focal plane from an in-focus position thereof at a focal length determined by a rotational position of said zooming ring;

first cam followers formed on said focusing lens frame; and corresponding second cam followers formed on said intermediate moving member;

wherein said focusing lens frame is movable relative to said zoom cam ring and is driven to rotate about said optical axis when said focusing ring is rotated;

wherein each of said first cam followers and respective said corresponding one of said second cam followers are engaged with a corresponding common focus cam of said focus cams; and wherein said focus cam ring moves in said optical axis direction relative to said focusing lens frame and said intermediate moving frame, and at the same time, rotates about said optical axis while being guided by said focus cams via said first and second cam followers to thereby change a position of engagement of said each first cam follower and said corresponding second cam follower relative to said corresponding common focus cam.

* * * * *